US006945383B2

(12) United States Patent
Pham

(10) Patent No.: US 6,945,383 B2
(45) Date of Patent: Sep. 20, 2005

(54) DISPENSING APPLICATOR AND METHOD OF USE

(75) Inventor: Le Pham, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 11 days.

(21) Appl. No.: 10/339,453

(22) Filed: Jan. 9, 2003

(65) Prior Publication Data

US 2003/0103126 A1 Jun. 5, 2003

Related U.S. Application Data

(62) Division of application No. 09/583,820, filed on May 30, 2000, now Pat. No. 6,530,658.

(51) Int. Cl.[7] ........ B65G 45/22
(52) U.S. Cl. ........ 198/495; 198/493; 198/494
(58) Field of Search ........ 198/495, 494, 198/493

(56) References Cited

U.S. PATENT DOCUMENTS

| | | | | | |
|---|---|---|---|---|---|
| 3,815,728 | A | * | 6/1974 | Vaughan | 198/495 |
| 4,918,778 | A | | 4/1990 | Chupin et al. | |
| 4,947,190 | A | | 8/1990 | Mizusawa et al. | |
| 4,960,200 | A | * | 10/1990 | Pierce | 198/495 |
| 4,976,342 | A | * | 12/1990 | Hwang | 198/495 |
| 4,991,430 | A | * | 2/1991 | Kaizu | 73/117 |
| 5,281,273 | A | | 1/1994 | Emposimato et al. | |
| 5,355,992 | A | * | 10/1994 | Baig et al. | 198/495 |
| 5,421,448 | A | * | 6/1995 | Falcioni | 198/498 |
| 5,423,411 | A | | 6/1995 | Kennett | |
| 5,455,609 | A | | 10/1995 | Gast et al. | |
| 5,526,028 | A | | 6/1996 | Rottman | |
| 5,605,750 | A | | 2/1997 | Romano et al. | |
| 5,613,594 | A | * | 3/1997 | Kootsouradis | 198/495 |
| 5,757,407 | A | | 5/1998 | Rezanka | |
| 6,050,392 | A | * | 4/2000 | Straub | 198/495 |
| 6,051,076 | A | * | 4/2000 | Oechsle et al. | 134/15 |
| 6,053,648 | A | | 4/2000 | Mistyurik | |
| 6,168,261 | B1 | | 1/2001 | Miyake et al. | |
| 6,196,374 | B1 | * | 3/2001 | Kilgert et al. | 198/495 |
| 6,227,350 | B1 | * | 5/2001 | Yoshizako et al. | 198/499 |
| 6,302,263 | B1 | * | 10/2001 | Bennett et al. | 198/495 |
| 6,360,758 | B1 | * | 3/2002 | Eivola et al. | 134/122 R |
| 6,364,959 | B1 | * | 4/2002 | Straub et al. | 134/9 |
| 6,533,102 | B2 | * | 3/2003 | Franzoni et al. | 198/495 |
| 6,575,290 | B2 | * | 6/2003 | Loning et al. | 198/495 |
| 6,688,434 | B2 | * | 2/2004 | Johnson et al. | 184/15.3 |
| 6,698,878 | B1 | * | 3/2004 | Roche et al. | 347/104 |

FOREIGN PATENT DOCUMENTS

| | | |
|---|---|---|
| EP | 0448080 | 9/1991 |
| EP | 863011 | 9/1998 |
| JP | 405131618 | 5/1993 |
| JP | 11192694 | 7/1999 |

OTHER PUBLICATIONS

Euopean Search Report, Jul. 26, 2001.

* cited by examiner

*Primary Examiner*—Douglas Hess

(57) ABSTRACT

A solvent dispensing mechanism is fluidically coupled to create a substantially uniform wet region of a belt surface scrubber. Mechanisms for selectively engaging and disengaging the scrubber ensure free belt travel during flexible material transport and the cleaning of both surfaces during cleaning cycles. The system includes consumable piece-part elements for refurbishing and remanufacturing.

22 Claims, 10 Drawing Sheets

DISPENSING APPLICATOR AND METHOD OF USE

RELATED APPLICATIONS

This application is a divisional of U.S. patent application Ser. No. 09/583,820, filed May 30, 2000 now U.S. Pat. No. 6,530,658, which is incorporated herein by reference.

BACKGROUND OF THE INVENTION

1. Field of the Invention

The present invention relates generally to transport belts (sometimes referred to in the art as conveyor belts), particularly to a method and apparatus for cleaning a transport belt and, more specifically, to cleaning a print media transport belt in an ink-jet hard copy apparatus.

2. Description of Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions. Ink-jet devices are also described by W. J. Lloyd and H. T. Taub in *Output Hardcopy* [*sic*] *Devices*, chapter 13 (Ed. R. C. Durbeck and S. Sherr, Academic Press, San Diego, 1988).

FIG. 1 (PRIOR ART) depicts a hard copy apparatus, in this exemplary embodiment a computer peripheral, ink-jet printer, 101. A housing 103 encloses the electrical and mechanical operating mechanisms of the printer 101. Operation is administrated by an electronic controller 102 (usually a microprocessor or application specific integrated circuit ("ASIC") controlled printed circuit board) connected by appropriate cabling to a computer (not shown). It is well known to program and execute imaging, printing, print media handling, control functions and logic with firmware or software instructions for conventional or general purpose microprocessors or with ASIC's. Cut-sheet print media 105, loaded by the end-user onto an input tray 120, is fed by a suitable paper-path transport mechanism (not shown) to an internal printing station where graphical images or alphanumeric text is created. A carriage 109, mounted on a slider 111, scans the print medium. An encoder subsystem 113 is provided for keeping track of the position of the carriage 109 at any given time. A set of individual ink-jet pens, or print cartridges, 115"X" is mounted in the carriage 109 (generally, in a full color system, inks for the subtractive primary colors, cyan, yellow, magenta (X=C, Y, or M) and true black (X=K) are provided; in some implementations an ink-fixer chemical (X=F) is also used). An associated set of replaceable or refillable ink reservoirs 117"X" is coupled to the pen set by ink conduits 119. Ink is deposited on the sheet of media 105 at a "print zone," or "printing station," 107. Once a printed page is completed, the print medium is ejected onto an output tray 121. The carriage scanning axis is conventionally designated the x-axis, the print media transit axis is designated the y-axis, and the printhead firing direction is designated the z-axis.

For convenience of describing the ink-jet technology and the present invention, all types of print media are referred to simply as "paper," all compositions of colorants are referred to simply as "ink," and all types of hard copy apparatus are referred to simply as a "printer." No limitation on the scope of invention is intended nor should any be implied.

FIG. 2 is a schematic depiction of another ink-jet hard copy apparatus 210 as may be associated with the present invention. A writing instrument 115X is provided with a printhead 214 having drop generators including nozzles for ejecting ink droplets onto an adjacently positioned print medium, e.g., a sheet of paper 105, in the apparatus' printing zone 107. A perforated, endless-loop belt 232 is one type of known manner printing zone input-output paper transport. A motor 233 having a drive shaft 230 is used to drive a gear train 235 coupled to a belt pulley, or roller, 238 mounted on a fixed axle 239. A biased idler wheel 240 provides appropriate tensioning of the belt 232. The belt rides over a platen 236 (sometimes including heating devices) in the print zone 107 associated with a known manner vacuum induction system 237. The paper sheet 105 is picked from an input supply (not shown) and its leading edge 254 is delivered to a guide 250, 252 where a pinch wheel 242 in contact with the belt 232 takes over and acts to transport the paper sheet 105 through the printing zone 107 (the paper path is represented by arrow 231). Downstream of the printing zone 107, an output roller 244 in contact with the belt 232 receives the leading edge 254 of the sheet 105 and continues the paper transport until the trailing edge 255 of the now printed page is released.

Ink-jet technology is used to describe the present invention even though it has wider applicability because the ink-jet environment typifies a transport belt use where the local environment may contain contaminants such as ink mist and paper dust which can soil a transport belt and clog perforations in a vacuum belt or even be sucked through the belt, contaminating the subjacent platen and other subsystems of the apparatus. Furthermore, the latest generation of ink-jet printers has found commercial success for economical color printing of high resolution graphics, including photographic reproductions, which require edge-to-edge paper printing (referred to as "full bleed"). Overspray and aerosol will build up on the belt over time. Not only does this affect performance of the belt itself, ink on the belt can be transferred undesirably to the back side of the print, particularly if the ink remains in a liquid or semi-fluidic state.

It can also be recognized that this type of problem can occur in other vacuum transport systems such as for transporting thin sheets of metal where particulate flakes might be present or for coating processes where an aerosol spray is used on a passing receptor on the transport belt.

Thus, there is a need for a method and apparatus for cleaning transport belts.

SUMMARY OF THE INVENTION

A solvent dispensing mechanism is fluidically coupled to create a substantially uniform wet region of a belt surface scrubber. Mechanisms for selectively engaging and disengaging the scrubber ensure free belt travel during flexible material transport and the cleaning of both surfaces during cleaning cycles. The system includes consumable piece-part elements for refurbishing and remanufacturing.

In a basic aspect, the present invention provides a method for cleaning a transport belt, comprising the steps of: positioning a cleaning member in non-contacting juxtaposition to a transport surface of the belt; and selectively repositioning the cleaning member into contact with the transport surface while distributing a cleaning solvent substantially uniformly across the cleaning member.

In another basic aspect, the present invention provides a transport belt cleaning apparatus, said belt having a sheet material transporting surface, comprising: means for cleaning non-contactingly juxtaposed on each side of the belt; means for distributing a cleaning solvent substantially uniformly across cleaning members of the means for cleaning; and means for selectively engaging the cleaning means with the belt.

In another basic aspect, the present invention provides an ink-jet hard copy apparatus comprising: a transport belt for media input-output; belt surface cleaners including a belt inner-surface cleaner and a belt outer-surface cleaner; a mechanism for releasably engagable the belt surface cleaners and with the belt surfaces respectively; and fluidically coupled to at least one of the belt surface cleaners, a belt cleaning solvent subsystem for dispensing solvent substantially uniformly onto the at least one belt surface cleaner prior to or during engagement of the at least one belt surface cleaner with the belt.

In another basic aspect, the present invention provides a transport belt cleaning device for use with a supply of cleaning solvent, comprising: a wiper; a fluid manifold for evenly distributing a cleaning solvent across the wiper, including a fluidic coupling for connecting the fluid manifold to the supply of the cleaning solvent.

In another basic aspect, the present invention provides an ink-jet hard copy apparatus endless-loop, vacuum-actuated, media transport belt cleaning system comprising: a supply of belt cleaning fluid; a fluid delivery subsystem coupled to the supply; a renewable first belt cleaning subsystem mounted adjacent an inner surface of the belt, including at least one belt wiper; a renewable second belt cleaning subsystem mounted adjacent an outer surface of the belt, wherein the first belt cleaning subsystem and second belt cleaning subsystem are contraposed with the belt therebetween and are selectively engagable and disengagable with the respective inner surface and outer surface, and wherein the second belt cleaning subsystem includes a cleaning fluid distribution subsystem for dispensing the fluid substantially uniformly across the second belt cleaning subsystem prior to and during engaging the second cleaning subsystem with the outer surface of the belt.

Some advantages of the present invention are:

it provides a self-contained subsystem which may be repaired, replenished, or replaced independently the transport belt subsystem;

it provides commercial implementation using consumable parts which can be obtained and installed by the end user; and it provides a simple re-manufacture capability to the apparatus in which it is implemented.

The foregoing summary and list of advantages is not intended by the inventors to be an inclusive list of all the aspects, objects, advantages and features of the present invention nor should any limitation on the scope of the invention be implied therefrom.

This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
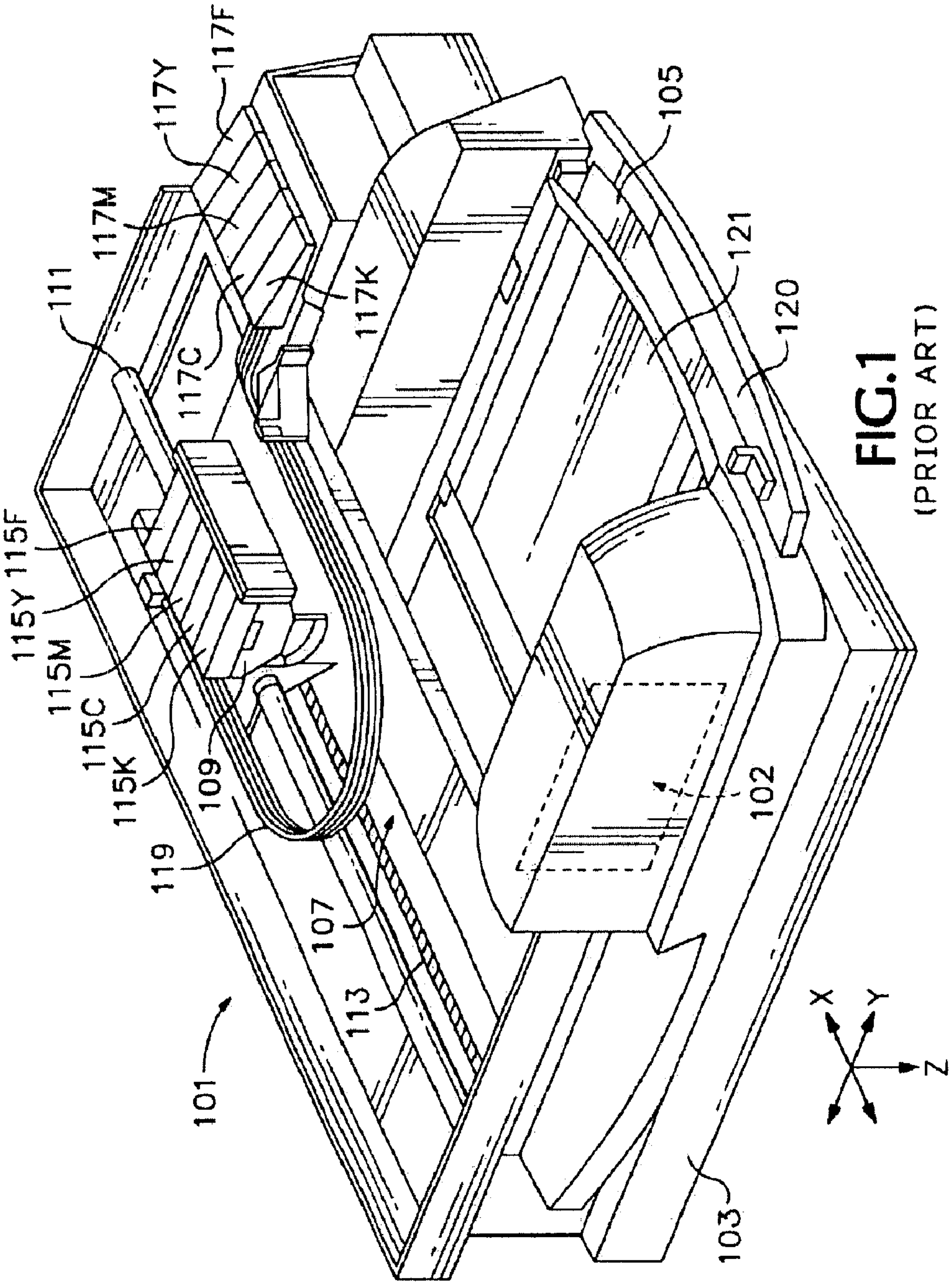
FIG.1 (PRIOR ART)
FIG. 1 (PRIOR ART) is a perspective view drawing typifying an ink-jet hard copy apparatus.
Figure 2:
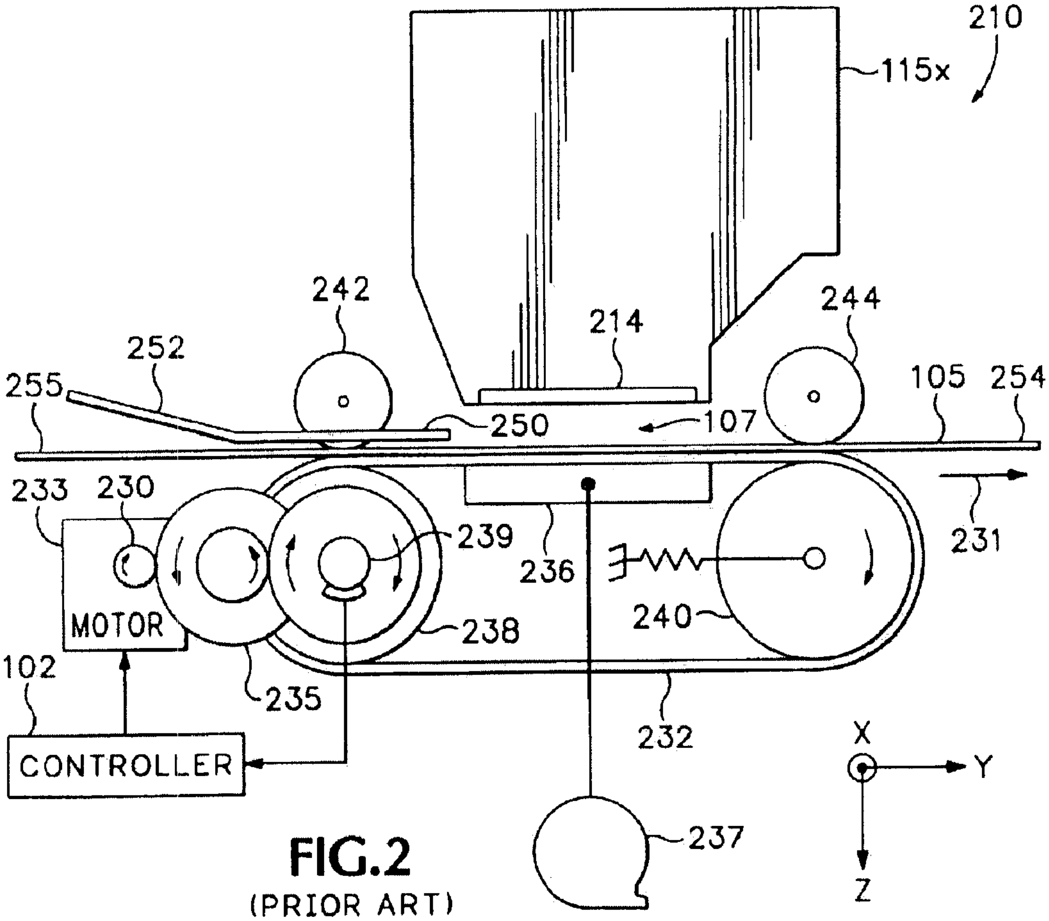
FIG.2 (PRIOR ART)
FIG. 2 (PRIOR ART) is a schematic elevation view illustration of a paper transport vacuum belt type ink-jet hard copy apparatus.
Figure 3:
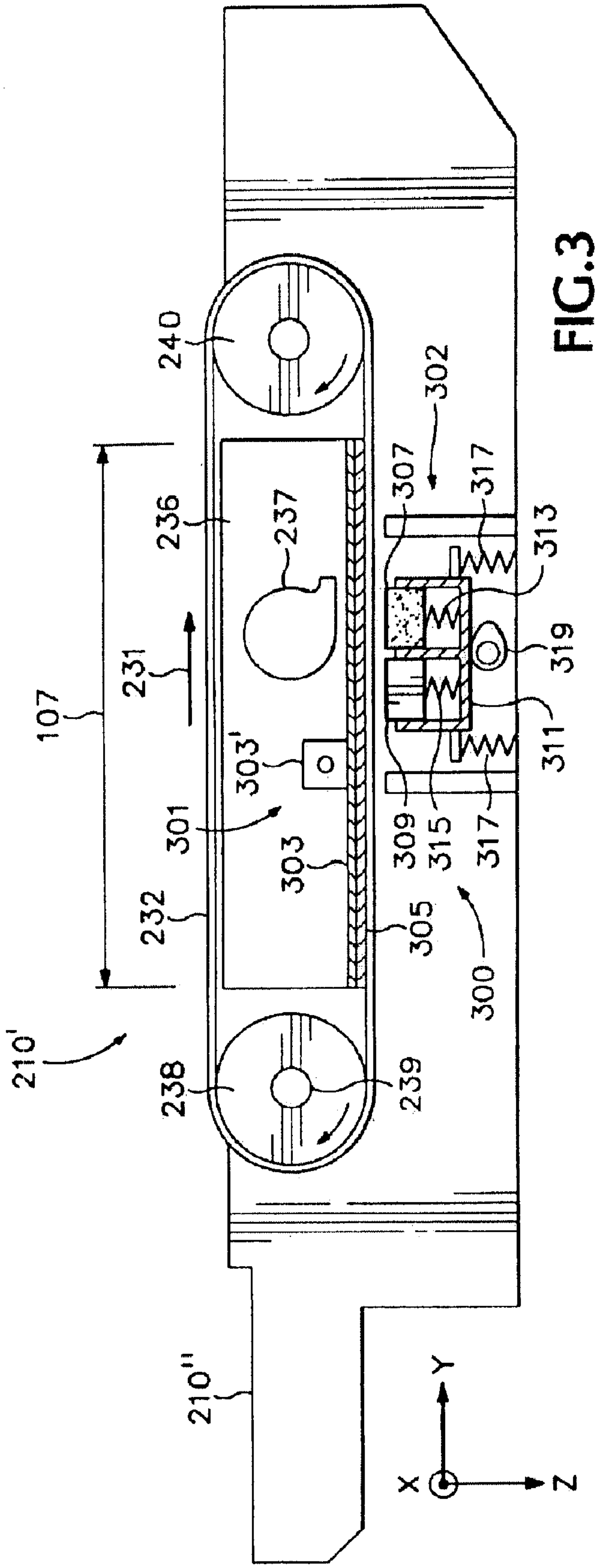
FIG. 3 is a schematic elevation view illustration of a paper transport vacuum belt type ink-jet hard copy apparatus showing a first embodiment of belt cleaning devices in accordance with the present invention.

Turning to FIG. 3, a belt cleaning subsystem 300 in accordance with the present invention is shown in an exemplary embodiment implementation as part of an ink-jet hard copy apparatus 210' schematically represent by a framework 210".

The present invention comprises two subsystems: a belt 232 inner-surface cleaner 301 and a belt outer-surface cleaner 302, wherein the "outer-surface" is a vacuum-holding transport surface of the belt. The cleaner 301, 302 subsystems are preferably independently serviceable. In the exemplary embodiment shown, the cleaner 301, 302 subsystems are subjacent a vacuum-box-platen 236.

The inner-surface cleaner 301 includes an inner-surface wiper mount 303, such as a stiff, flat plate—e.g., a metal, sheet metal, or plastic plate—with a mounting flange 303'. The wiper mount 303 should be at least as wide as the belt 232 cross-sectional dimension and have a length to optimize wiping area and wiper absorbent capacity as the belt passes between the drive rollers 239, 240. A belt inner-surface wiper 305 is affixed to the mount 303 such that a wiping surface is adjacent the inner-surface of the belt 232. In order to prevent excessive wear it is preferable that the wiping surface to belt inner-surface have a clearance, e.g., approximately one millimeter ("mm"), when not being used to clean the inner-surface. It is preferred that this wiper 305 be fabricated of a dry, absorbent, lint-free material. For example, a three-to-five millimeter thick, felt pad, or a relatively high density, absorbent, sponge material may be employed. Launderable, reusable, pad materials can be employed. Disposable pad materials can be employed. In general, the contact surface of wiper, or pad, 305 material should be relatively smooth and somewhat compliant in order to clean the belt surface effectively. If made of a fiber-based material, the contact surface of the wiper 305 could be singed or otherwise treated as would be known in the art to prevent fibers from tracking onto the belt 232. All wiper materials should be soft enough not to damage belt surfaces.

The inner-surface wiper 305 can be glued to the mount 303 such that the entire subsystem is disposable and replaceable. Alternatively, the inner-surface wiper 305 can be releasably secured to the mount 303 in a known manner so that the belt inner-surface wiper 305 is removable and replaceable with a clean wiper replacement pad for a reusable mount 303. The inner-surface wiper 305 should be equal to or slightly greater than the belt 232 width dimension.

The outer-surface belt cleaner 302 subsystem could be a mirror embodiment of the inner-surface belt cleaner 301, subjacent the belt 232 opposing the inner-surface belt cleaner 301 subsystem. Each subsystem 301, 302 can employ a known manner elevating subsystem to engage respective wipers with the belt 232 inner and outer surfaces. However, as the outer surface of the belt 232 will have a far greater degree of deposits, it has been found to be preferable to use both wet and dry wiping of at least the outer surface.

As shown in the embodiment of FIG. 3 therefore, a wet pressure pad 307 and a dry pressure pad 309 are provided in series for sequentially wiping the belt 232 outer surface. In the belt travel direction, arrow 231, the wet pressure pad 307 is upstream and the dry pressure pad 309 downstream. A pad holder 311 is mounted in the apparatus 210' subjacent the belt 232 and opposing at least some part of the inner-surface belt cleaner 301 subsystem. The pad holder 311 is provided with positive pressure biasing members 313, 315 for each pad 307, 309. The pad holder 311 is mounted on at least one return biasing member 317. In the shown embodiment, a clearance, for example in the range of approximately one to three millimeters, is provided between the reach of each pads' 307, 309 cleaning surface and the outer surface of the belt 232 when the subsystem 302 is disengaged. The belt 232 during a paper transport and printing operational cycle through the print zone 107 is thus free to travel between the inner-surface cleaner 301 and the outer-surface cleaner 302. To clean the belt 232, the elevating subsystem 319 (in this embodiment a cam having a mechanical linkage (not shown) for end-user manipulation) lifts the holder 311 until the gap between the wet pressure pad 307 and dry pressure pad 309 in the holder 311 and the belt surface is closed. Then, the holder 311 elevating subsystem 319 continues upward until the gap between the inner-surface belt cleaner 301 is also closed. Thus, both surfaces of the belt 232 are being wiped by the belt wiping pads 305, 307, 309 when the elevating subsystem 319 is engaged. It should be recognized that separate elevating subsystems can be provided for each cleaner subsystem 301, 302. The wet pressure pad 307 is pre-soaked with a solvent appropriate to the type of ink employed (or other aerosol chemical being used in a non-ink-jet environment). The dry pressure pad 317 should be absorbent of the solvent and ink residue and solvent mixtures.

Either the entire belt outer-surface cleaner 302 subsystem can be replaceable as a unit or each pad can be separately replaceable in the same manner as with the inner-surface wiper 305. The wet and dry cleaning pads may be replaceable at every cleaning cycle or be designed to be more durable as needed.

In operation, such when ink smearing is noticed on the back side of a finished print or during routine maintenance by the end-user, fresh wipers are installed if needed, and the cam 319 is turned (counter-clockwise in this illustration) to raise the holder 311 and contained pressure pads 307, 309 up against the outer surface of the belt 232 (direction indicated by arrows on the belt drive rollers 239, 240) until the biasing members 313, 315 exert enough force to push the belt 232 upward until its inner surface is pressed against the inner surface wiper 305. The pressure will squeeze some solvent out of the wet pad 307. Note that since the belt 232 is perforated for transmission of a vacuum in this embodiment, some solvent will be passed through the perforations to the inner surface of the belt and, consequently, onto the inner surface wiper 305. The inner wiper 305 can be of a material having a higher surface energy than that of the transport surface wipers 307, 309 in order to help solvent to be drawn through the belt perforations. Thus, both sides of the belt 232 are "washed." Downstream, the inner surface wiper 305 and the dry pressure pad 309 will absorb the mixture of solvent and particulate residue washed from the belt 232.

After a predetermined, recommended time of contact, the cam 319 is reversed and the belt 232 released from the cleaner 301, 302 subsystems. While a predetermined pressure of the wipers against the belt surfaces can be tailored, it should also be recognized that solvent can be transferred to the belt via capillary forces created by the interface between the belt and wipers when the belt is moving.

In order to eliminate reverse bending of the belt and reduce belt fatigue, the inner surface cleaning subsystem can also be movable into engagement with the belt only during a cleaning operation.

Figure 3A:
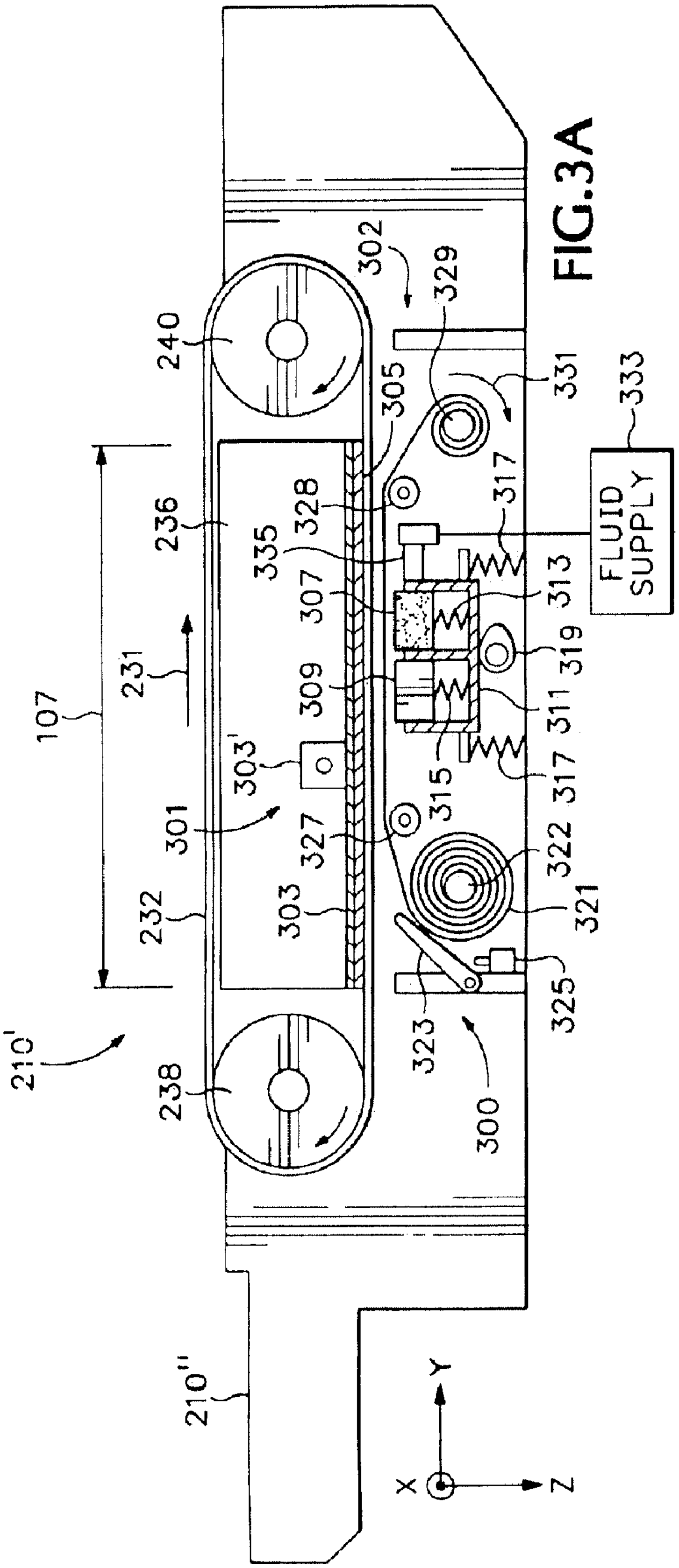
FIG. 3A is a schematic elevation view illustration of a paper transport vacuum belt type ink-jet hard copy apparatus showing a second embodiment of belt cleaning devices in accordance with the present invention.

Turning now to FIG. 3A, an alternative embodiment is depicted in which the outer-surface cleaner 302 includes a rolled web 321 mounted on a rotating shaft 322. The web 321 is a rolled supply of belt wiping material, preferably an absorbent fabric such as a fiber-based polyester, rayon, absorbent cotton cloth, or the like textile. A web material having a thickness in the range of approximately 45 um to 140 um has been employed. The web 321 is mounted on the shaft 322 for free rotation with the shaft. A known manner tensioner 323 and out-of-web sensor 325 are associated with the web 321. The web 321 material is stretched from the roll across two support shafts, or adjunct rollers, 327, 328 to span the pressure pads 307, 309 subjacent the belt 232 outer surface. The web 321 is then captured by a driven, web take-up spool 329. The direction of rotation of the take-up spool, and thus the web material, is indicated by arrow 331. The spool 329 can be driven by a stepper motor to advance the web 321 in predetermined increments so that a fresh segment of web material is properly positioned subjacent the belt 232 for each cleaning cycle. A clearance of approximately 1 mm to 3 mm between the cleaner web 321 and belt 232 transport surface is provided when the web is disengaged from the belt transport surface.

A solvent suitably selected as appropriate for a particular ink formulation (or other particulate matter sought to be "washed" from the belt) is provided in a solvent dispensing subsystem 333 (schematically represented for any known manner local or remote, replaceable, refillable or otherwise serviceable solvent dispensing subsystem) with fittings 335 for fluidically coupling solvent to the wet pressure pad 307. Known manner techniques for dispensing and monitoring of solvent to the wet pressure pad 307—such as with appropriate valves and pumps—can be employed.

In operation during a belt cleaning cycle, the cam 319 is used to lift the holder 311 until the web material is in contact with the belt 232 outer surface and the inner-surface wiper 305 is in contact with the belt inner surface. Solvent is pumped into the wet pressure pad 307, generally at a fixed delivery rate or to a predetermined appropriate volume. The solvent will be transferred to the web 321 material superjacent the wet pressure pad 307 and thus to the belt 232 outer surface.

During a cleaning cycle, the web 321 can be wound onto the spool 329 in a direction 331 opposite of the belt 232 motion 231 to cause a stronger scrubbing force against the belt outer surface. As wound onto the spool 329 during a cleaning cycle, the web 321 will carry away dissolved ink on the belt 232 outer surface from the contact-cleaning zone. Some solvent will go through the belt perforations and onto the inner surface thereof, cleaning some ink from the perforations in addition to the inner surface itself. Any solvent solution left on the belt 232 downstream of the wet pressure pad 307 will be wiped off, absorbed by the web being pressed against the belt outer surface by the dry pressure pad 309. Alternatively, the web 321 can be stationary during the cleaning cycle for winding onto the spool 329 after the holder 311 is lowered to disengage the inner-surface wiper 305 and web 321 from respective belt 232 surfaces. This has been found to increase the useful effective life of the web 321 material; however it should be noted that during the cleaning cycle itself the web material then does not carry dissolved ink away from the cleaning zone.

The outer-surface cleaner 302 can be a completely replaceable, unitary, module or an in situ refurbishable subsystem wherein components such as the web 321, wipers 307, 309, and solvent dispensing subsystem 333 are individually replaceable or otherwise serviceable. Used pads 305, 307, 309 and web material can be manufactured to be disposable, end-user replaceable, or remanufacture-type consumables.

In operation during an paper transport cycle through the print zone 107, the belt 232 is preferably free to travel between the belt lower span's superjacent inner-surface cleaner 301 and a subjacent web 321 span region. To clean the belt 232, the elevating subsystem 319 lifts the holder 311 until the gap between the web 321 region spanning the wet pressure pad 307 and dry pressure pad 309 and the belt 232 transport surface is closed. Then, the holder 311 elevating subsystem 319 continues upward until the gap between the inner-surface belt cleaner 301 and belt inner surface is also closed. Thus, both surfaces of the belt 232 are being wiped when the elevating subsystem 319 is engaged. Alternatively, the inner-surface belt cleaner 301 can also be separately selectively positionable such that reverse bending of the belt 232 and belt fatigue can be avoided. Note also that the wet and dry pads 307, 309 and therefore separate regions of the web 231 can be made selectively engagable with the belt transport surface separately.

As noted, either the entire belt outer-surface cleaner 302 subsystem can be replaceable as a unit or each pad and the web can be separately replaceable in the same manner as with the inner-surface wiper 305. It is also contemplated that depending upon the frequency of cleaning, the web 321 may be removed from the take-up spool 329 and re-loaded onto the shaft 322 and reused until such time as it is no longer effective in cleaning the belt 232 outer surface. In a more costly system, an automated rewind mechanism can be provided. The wet and dry cleaning pads 305, 307, 309 may be replaceable at the same time as the web 321 or be designed to be more durable as needed.

To summarize the end-user operation, when ink smearing is noticed on the back side of a finished print, or at the time of standard printer maintenance, predetermined throughput intervals, or even continuously for heavy duty printing such as full-bleed type printing cycles, the cam 319 is turned (counter-clockwise in this illustration) to raise the holder 311 and contained pressure pads 307, 309 up against the web 321 spanning the pads which then is pushed into contact with the moving belt 232 (see direction arrow 231) until the biasing members 313, 315 exert enough force to push the belt 232 upward until its inner surface is against the inner-surface wiper 305. Generally, solvent will transfer from the pad to the web by contact. A predetermined pressure between the two can be provided to cause some solvent to be squeezed out of the wet pad 307 and through the web 321 material. Since the belt 232 is perforated, some solvent will be passed through the perforations to the inner surface of the belt and, consequently, the inner-surface wiper 305. Thus, both sides of the belt 232 are "washed." Downstream, the inner-surface wiper 305 and the web 321 which are in contact with the dry pressure pad 309 will absorb the mixture of solvent and particulate residue washed from the belt 232. After a predetermined or recommended time of contact, the cam 319 is reversed and the belt 232 released from the cleaner 301, 302 subsystems.

Figure 4:
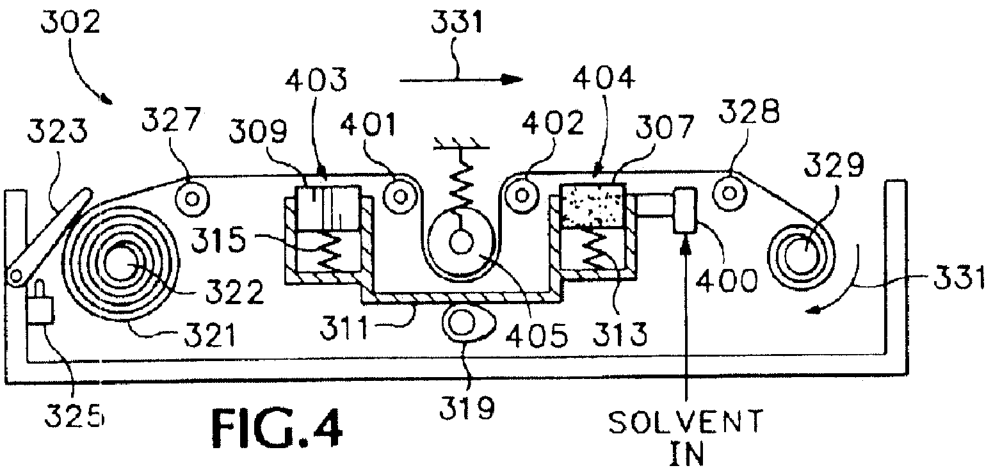
FIG. 4 is a schematic elevation view illustration of a third embodiment of belt cleaning devices in accordance with the present invention.

FIG. 4 shows an alternative embodiment of the belt outer-surface cleaner 302 subsystem. The solvent, represented by the arrow labeled "SOLVENT IN," is in a containment and delivery subsystem (not shown) located remotely from the outer-surface cleaner 302 subsystem, coupled to the wet pressure pad 307 by a fitting 400. The solvent containment can be refillable or replaceable or otherwise serviceable. To improve the "washing" and "drying" action of the outer-surface cleaner 302 subsystem, the dry pressure pad 309 and wet pressure pad 307 are spaced further apart. A pair of additional web support shafts, or rollers, 401, 402 are mounted in-board of each pad 307, 309 to create separate span regions 403, 404 of the web superjacent to each pad individually. A biased, central web roller 405 can be mounted in the holder 311 between the pads 307, 309 and lower than the pads, forming therebetween an inter-pad loop region of web 321 to move the dry pressure pad 309 a greater effective distance away from the wet pressure pad 307 and preventing cross-contamination. Generally, depending on the solvent solution and the physical properties of the absorbent web material, solvent solution may wick and spread on the web in different areal dimensions. Therefore, any specific implementation should be tailored to prevent cross-contamination between wet and dry regions. The distance between a dry and wet pad may be varied. With careful design, the roller 405 might be eliminated, reducing manufacturing complexity and cost.

It should also be recognized that in the embodiments depicted, the dry pad 309 is used to increase the cleaning effectiveness, but when the solvent solution is benign (such as just or mostly water) or highly evaporative such that no residue is left on the belt when the next media sheet is obtained at the input, the dry pad subsystem also can be eliminated.

Figure 4A:
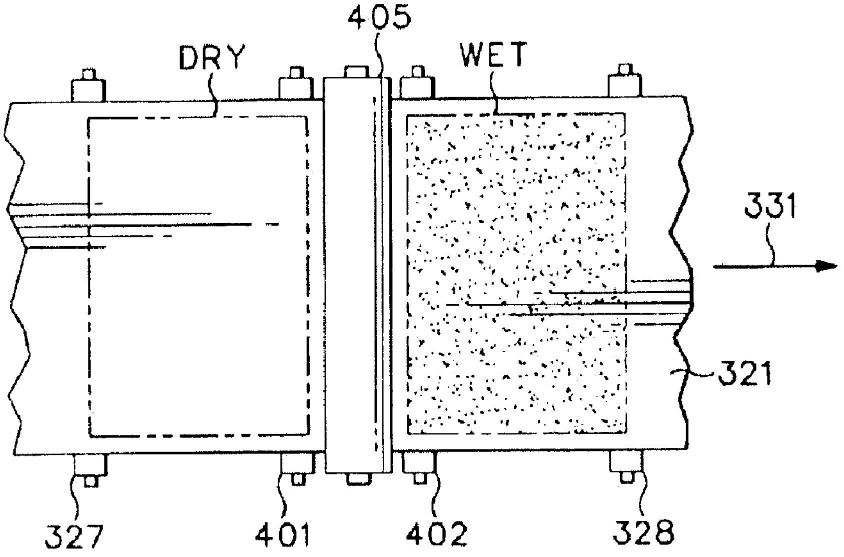
FIG. 4A is an overhead view illustration of details of the embodiment as shown in FIG. 4.

Note also that the solvent fitting 400 might instead be coupled to the central web roller 405 in a manner to dispense the solvent directly onto the web 321 itself rather than via wet pressure pad 307, creating a larger effective wet area of web material as illustrated schematically by orthogonal projection FIG. 4A.

Figure 5:
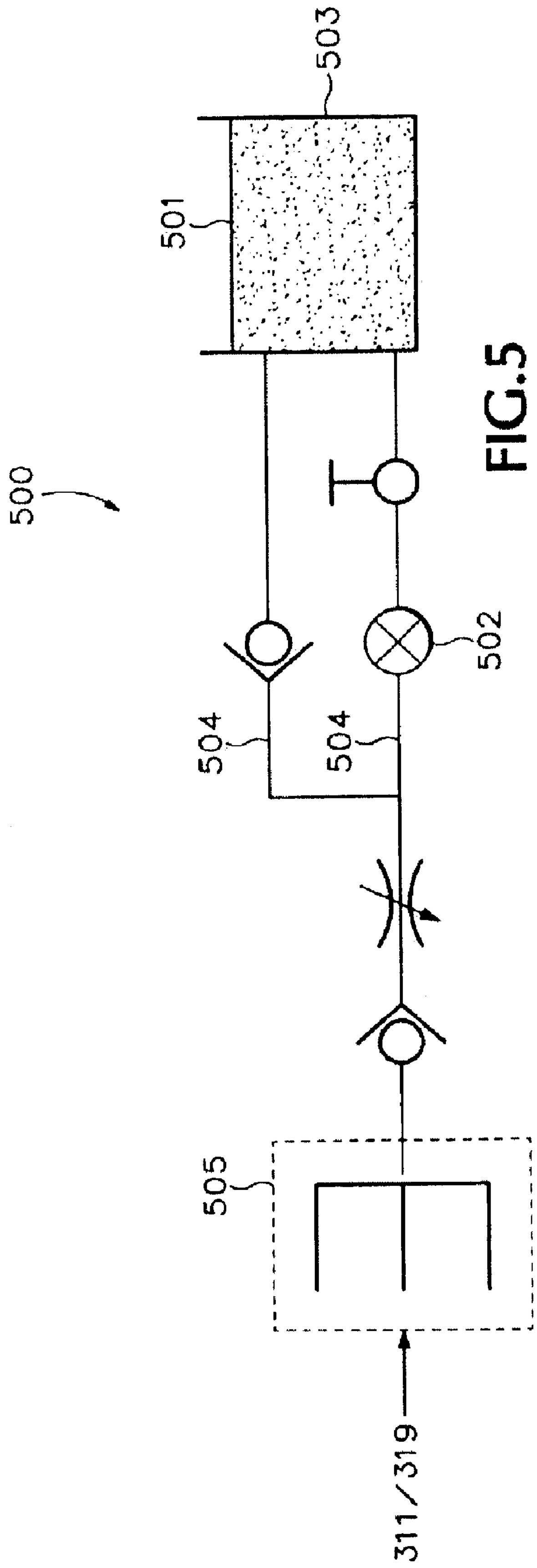
FIG. 5 is a schematic diagram of a solvent dispensing subsystem in accordance with the present invention employable with the embodiment as shown in FIGS. 3A, 4 and 6.

FIG. 5 is a schematic, symbolic diagram of a belt cleaning system 500 where the solvent solution 501 is provided from a replaceable or refillable container 503. A fluid coupling, such as flexible tubing, 504 is connected between the container 503 and a dispensing manifold 505 via a pump 502, such as a metering, precision pump as would be known in the art. Appropriate check valves and flow control as would be known in the art can be added if necessary. In order to prevent overflow, solvent 501 is pumped to the manifold 505 in a predetermined volume or for a predetermined time, depending on the programmed cleaning cycle parameters or until the end-user retracts the belt cleaning subsystem 300 using the cam 319 lift mechanism associated with the holder 311.

Figure 6:
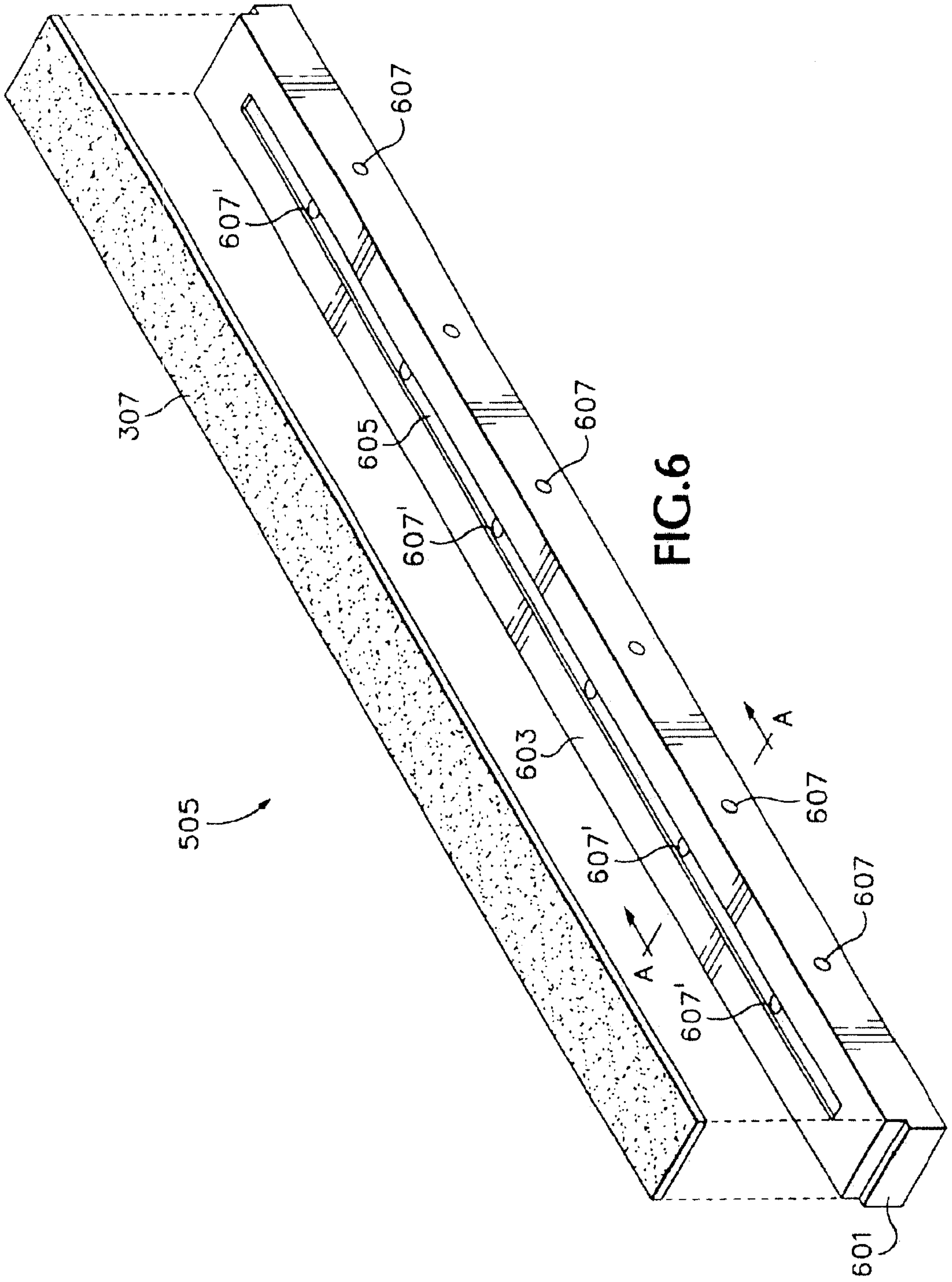
FIG. 6 is a perspective view illustration of a solvent dispensing device in accordance with the present invention as shown in FIG. 5.
Figure 6A:
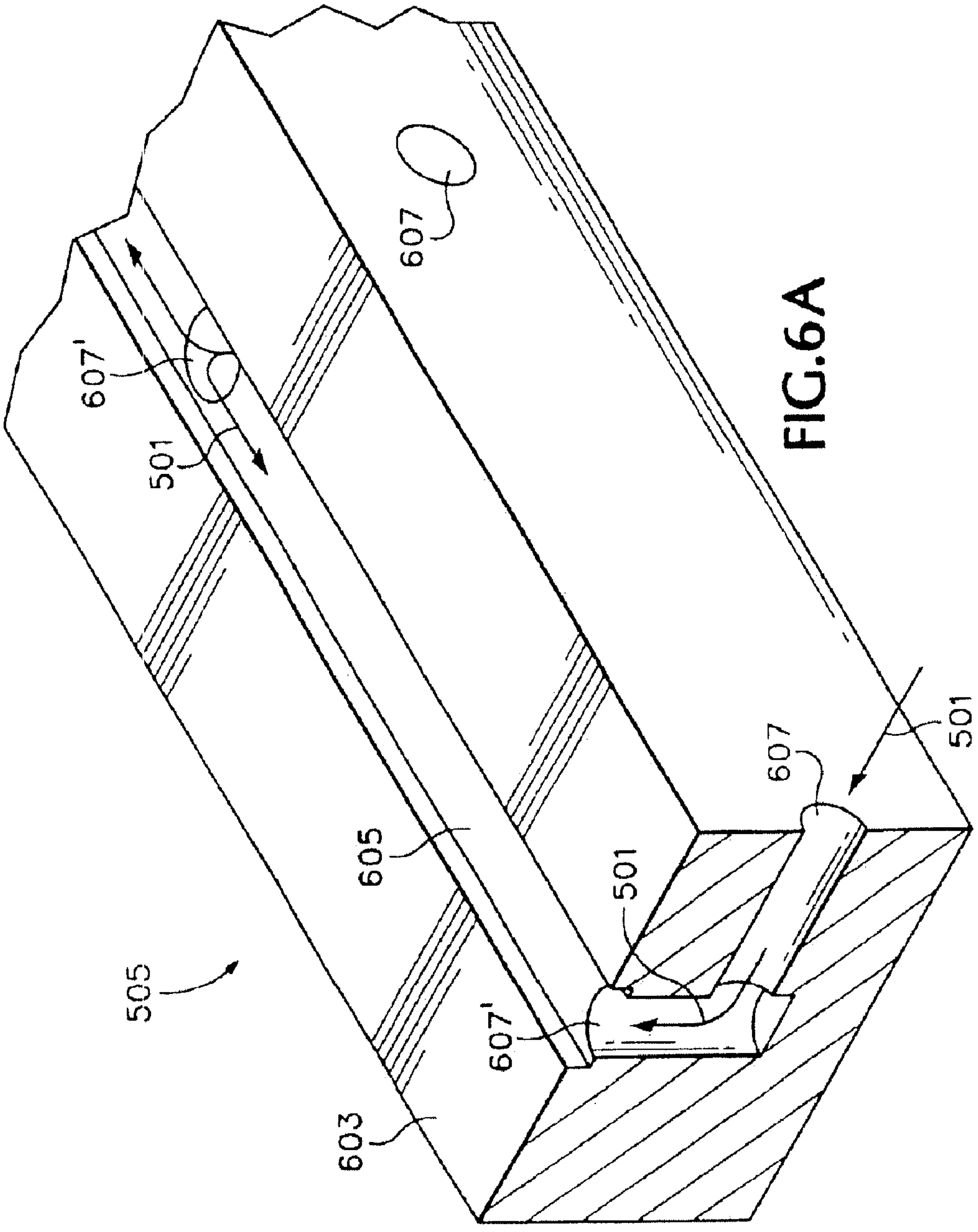
FIG. 6A is a perspective view illustration of detail from FIG. 6.

FIGS. 6 and 6A show a first embodiment of a dispensing manifold 505 with the wet pressure pad 307 removed (FIG. 6 is an exploded view) to expose the working features of the manifold. The manifold 505 has a body member 601 with a pad mating surface 603 having a solvent distribution channel 605. The body member 601 is appropriately mounted to the holder 311 (FIGS. 3 and 4). The pressure pad 307 can be secured to the mating surface 603 in any known manner. The fluid coupling tubing 504 (FIG. 5) is connected to each of a plurality of solvent input ports 607. Each input port 607 leads to a riser section 607' for delivering pumped solvent 501 (represented by numbered arrows in FIG. 6A) into the distribution channel 605. Riser sections 607' may have different sizes depending on the dispensing volume desired, using the web material properties to provide control for a substantially uniform spreading of the solvent. Solvent 501 pumped into the distribution channel 605 will spread along the channel floor and will be wicked into the pad substantially uniformly. A distribution channel 605 of about one millimeter depth has been employed, allowing rapid distribution of the solvent 501 to the underside of the pad 307. Having a riser section 607 also allows excess solvent not absorbed by the pad 307 (and by the superjacent web 321 material in the embodiment of FIG. 4) and used during the cleaning cycle to drain away. As the solvent 501 will evaporate from the pressure pad 307 when not in use, it acts as a cap, reducing or substantially eliminating solvent evaporation.

Either the pressure pad 307 or the entire dispensing manifold assembly 505 can be disposable or refurbishable. A replaceable pad 307 can include a stiffening mounting shim (not shown) having a complementary central channel matching the distribution channel of the manifold body 601. Such a shim could include pad side walls for preventing solvent from wicking horizontally out of the pad.

Figure 7:
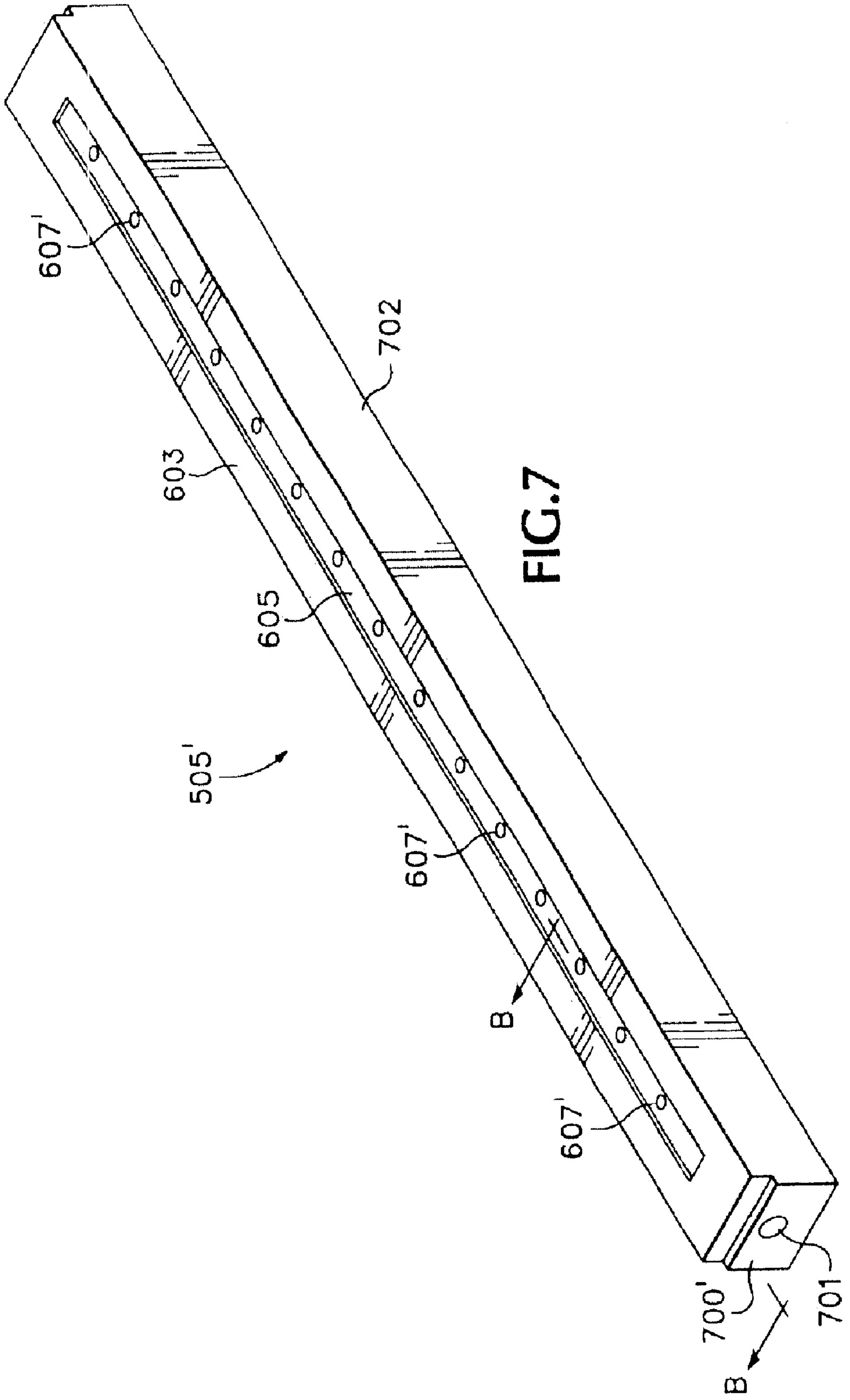
FIG. 7 is a perspective view illustration of an alternative embodiment of the present invention as shown in FIGS. 6 and 6A.
Figure 7A:
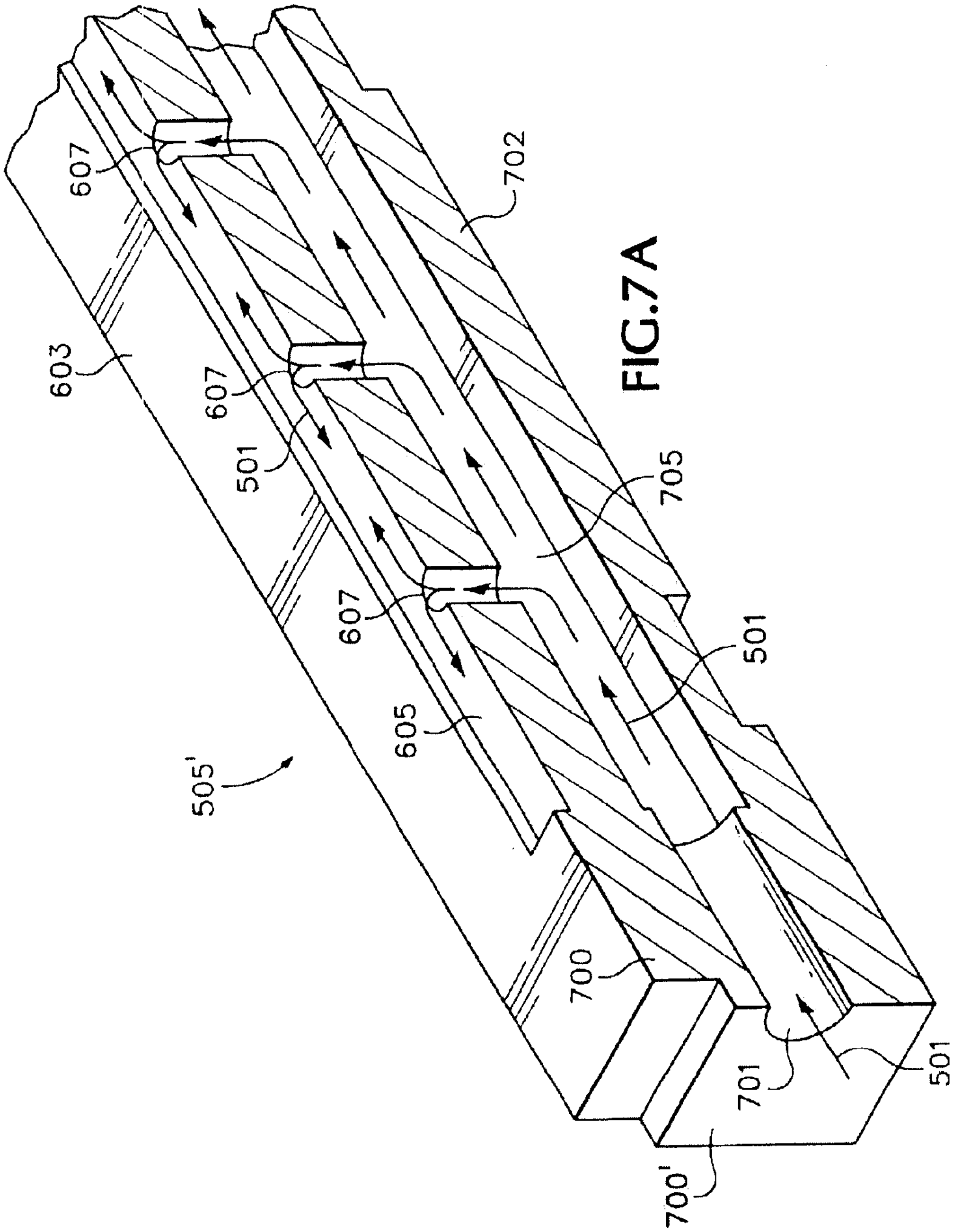
FIG. 7A is a perspective view illustration of detail from FIG. 7.

FIGS. 7 and 7A show an alternative embodiment for a solvent dispensing manifold 5051. The manifold 505' has an upper body 700 member and a lower body 702 member. The body members can be mounted to each other in a known manner. A single solvent solution input port 701 is provided at one end 700' of the upper body 700. The input port 701 leads to a horizontal solvent accumulation chamber 705 formed by providing grooves in the members 700, 702 for mating between the upper body 700 and lower body 702. A single input port 701 provides the advantage of reducing the number of input tubes 504 coupled to the manifold 505 to a single input tube and thereby easing solvent flow and volume control requirements. This embodiment may be beneficial where a peristaltic pump, having a relatively slow pumping rate, is used. The travel distance for the solvent 501 from the chamber 705 through the risers 607' will be maintained by this configuration such that delivery to each riser 607' is substantially equal.

The pad 307 may get fouled with ink which is transferred from the web material in the embodiment of FIG. 3A or FIG. 4 after some cleaning operations depending on the amount of ink cleaned, how often the web is advanced, and how much solvent is used. Operations can be tailored for each specific implementation to obtain an optimal service life for replaceable pads 307.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art.

The present invention has been described in an implementation for an ink-jet hard copy apparatus, but this is not intended as a limitation (nor should any be implied) as it is known to use vacuum belts in many conveyor systems for flexible materials. While the outer-surface cleaner 302 is shown as two replaceable pads, one wet and one dry, a single pad having a solvent wet region upstream and separated by gap from a dry, solvent-absorbing region may also be employed to reduce manufacturing costs and to simplify pad replacement. Moreover, it should be recognized that automated, electromechanical devices can be employed for activating the cleaner mechanisms to wipe the belt.

Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for. . . . "

What is claimed is:

1. A method for cleaning a transport belt, comprising:

positioning a dry cleaning member in non-contacting juxtaposition to a transport surface of the belt;

positioning a wet cleaning member in non-contacting juxtaposition to a transport surface of the belt;

selectively repositioning the dry cleaning member to a position where the dry cleaning member places a force on the transport surface; and selectively repositioning the wet cleaning member to a position where the wet cleaning member places a force on the transport surface while distributing a cleaning solvent substantially uniformly across the cleaning member.

2. The method as set forth in claim 1, comprising the further step of:

engaging an opposing surface of the belt with an absorbent material wiper contraposed to the wet cleaning member and the dry cleaning member in contact with the transport surface.

3. The method as set forth in claim 2, the step of engaging further comprising:

pressing the wet cleaning member against the belt such that the solvent passes through perforations in the belt and is received by the wiper.

4. The method as set forth in claim 1, comprising:

manifolding the solvent such that solvent is substantially uniformly absorbed across a non-contacting surface of the wet cleaning member from which non-contacting surface the solvent is wicked substantially uniformly to a surface of the wet cleaning member in contact with the transport surface of the belt.

5. A transport belt cleaning apparatus, said belt having a sheet material transporting surface, comprising:

means for cleaning non-contactingly juxtaposed on each side of the belt;

means for distributing a cleaning solvent substantially uniformly across cleaning members of the means for cleaning; and means for selectively engaging the cleaning means with the belt, wherein the cleaning means comprises:

a dry absorbent material first wiper mounted adjacently spaced from a non-transporting surface of the belt, and a dry absorbent material second wiper mounted adjacently spaced from the transporting surface of the belt, and wherein the means for selectively engaging further comprising:

a lift, and mounted in said lift, at least one pressure pad positioned for engaging the transporting surface of the belt such that the pad exerts a force against the transporting surface causing a contact pressure of an opposing side of the belt against the first wiper.

6. The apparatus as set forth in claim 5, wherein said force is predetermined for causing solvent to be transmitted through perforations of the belt to the first wiper.

7. The apparatus is set forth in claim 5, comprising:

said means for distributing solvent are consumable.

8. A transport belt cleaning apparatus, said belt having a sheet material transporting surface, comprising:

means for cleaning non-contactingly juxtaposed on each side of the belt;

means for distributing a cleaning solvent substantially uniformly across cleaning members of the means for cleaning; and means for selectively engaging the cleaning means with the belt, wherein the cleaning means comprises:

a dry absorbent material first wiper mounted adjacently spaced from a non-transporting surface of the belt, and a dry absorbent material second wiper mounted adjacently spaced from the transporting surface of the belt, and wherein the means for distributing a cleaning solvent comprises:

a third wiper; and a supply of cleaning solvent, and a fluid manifold coupling the third wiper to the supply such that the cleaning solvent is delivered substantially uniformly from the third wiper to the transporting surface of the belt during engagement therewith.

9. An ink-jet hard copy apparatus comprising:

a transport belt for media input-output;

belt surface cleaners including a belt inner-surface cleaner and a belt outer-surface cleaner, the belt outer-surface cleaner further comprising:

an outer-surface cleaner wet pad; and an outer-surface cleaner dry pad; and a mechanism for releasably engaging the outer-surface cleaner and the inner-surface cleaner with the belt surfaces respectively; and fluidically coupled to at least one of the belt surface cleaners, a belt cleaning solvent subsystem for dispensing solvent substantially uniformly onto the at least one belt surface cleaner prior to or during engagement of the at least one belt surface cleaner with the belt.

10. The apparatus as set forth in claim 9, further comprising an inner-surface cleaner dry pad, each of the outer-surface cleaner wet pad, the outer-surface cleaner dry pad, and the inner-surface cleaner dry pad being refurbishable.

11. The apparatus as set forth in claim 10, the belt cleaning solvent subsystem, further comprising:

means for manifolding solvent to the outer-surface wet pad such that solvent is uniformly distributed across the outer-surface wet pad during engagement with the belt outer surface.

12. The apparatus as set forth in claim 11, wherein the mechanism for releasably engaging provides a sufficient pressure for causing solvent to be passed through perforations of the belt for being absorbed by the inner-surface dry pad.

13. The apparatus as set forth in claim 11, comprising:

the means for manifolding is consumable.

14. The apparatus as set forth in claim 9 wherein the belt inner-surface cleaner and a belt outer-surface cleaner are consumables.

15. A transport belt cleaning device for use with a supply of cleaning solvent, comprising:

a dry wiper;

a wet wiper;

an absorbent material wiper on an opposite side of the transport belt from the dry and wet wipers; and a fluid manifold for evenly distributing a cleaning solvent across the wet wipers, wherein the wet wiper is pressed against the transport belt to pass the cleaning solvent through perforations in the transport belt.

16. The device as set forth in claim 15 wherein the wet wiper is replaceable.

17. The device as set forth in claim 15 wherein the wet wiper and the fluid manifold are replaceable as a unit.

18. The device as set forth in claim 15 wherein the dry wiper and the wet wiper are positioned on a transport side of the transport belt.

19. The device as set forth in claim 15 wherein the absorbent material wiper is positioned on a non-transport side of the transport belt.

20. The device as set forth in claim 15 wherein the dry wiper and the wet wiper selectively engage the transport belt.

21. The device as set forth in claim 15 further comprising a lift to selectively engage at least one wiper with the transport belt.

22. An ink-jet hard copy apparatus endless-loop, vacuum-actuated, media transport belt cleaning system comprising:

a renewable first belt cleaning subsystem mounted adjacent an inner surface of the belt, including a first dry belt wiper;

a renewable second belt cleaning subsystem including:

a first dry belt wiper; and a wet belt wiper, wherein the renewable second belt cleaning subsystem is mounted adjacent an outer surface of the belt wherein the first belt cleaning subsystem and second belt cleaning subsystem are contraposed with the belt therebetween and are selectively engagable and disengagable with the respective inner surface and outer surface, and wherein the second belt cleaning subsystem includes a cleaning fluid distribution subsystem for dispensing the fluid substantially uniformly across the wet belt wiper of the second belt cleaning subsystem prior to and during engaging the second cleaning subsystem with the outer surface of the belt.

* * * * *

UNITED STATES PATENT AND TRADEMARK OFFICE

CERTIFICATE OF CORRECTION

PATENT NO. : 6,945,383 B2
APPLICATION NO. : 10/339453
DATED : September 20, 2005
INVENTOR(S) : Le Pham It is certified that error appears in the above-identified patent and that said Letters Patent is hereby corrected as shown below:

Column 7, line 44, delete “an” and insert therefor --a--

Column 12, Claim 16, line 46, delete “wipers,” and insert therefor --wiper;--

Signed and Sealed this

Twelfth Day of December, 2006

JON W. DUDAS
*Director of the United States Patent and Trademark Office*